(12) United States Patent
Saito et al.

(10) Patent No.: US 10,532,383 B2
(45) Date of Patent: Jan. 14, 2020

(54) METHOD OF PRODUCING THREE-DIMENSIONAL OBJECT AND REMOVING LIQUID TO BE USED IN THE PRODUCTION METHOD

(71) Applicant: CANON KABUSHIKI KAISHA, Tokyo (JP)

(72) Inventors: Tomohiro Saito, Utsunomiya (JP); Yukio Hanyu, Isehara (JP); Akira Sugiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 15/332,116

(22) Filed: Oct. 24, 2016

(65) Prior Publication Data
US 2017/0120533 A1    May 4, 2017

(30) Foreign Application Priority Data

Oct. 30, 2015   (JP) ................................ 2015-214170
Oct. 18, 2016   (JP) ................................ 2016-204268

(51) Int. Cl.
| | | |
|---|---|---|
| *B08B 3/04* | (2006.01) | |
| *B33Y 10/00* | (2015.01) | |
| *B33Y 40/00* | (2015.01) | |
| *B29K 105/00* | (2006.01) | |
| *B29K 105/06* | (2006.01) | |

(52) U.S. Cl.
CPC ................ *B08B 3/04* (2013.01); *B33Y 10/00* (2014.12); *B33Y 40/00* (2014.12); *B29K 2105/06* (2013.01); *B29K 2105/251* (2013.01)

(58) Field of Classification Search
CPC ........... B08B 3/04; B33Y 10/00; B33Y 40/00; B29C 64/386; B29C 64/141; B29C 64/40; C11D 1/886; C11D 11/0023; G03G 15/224; G03G 15/225; B29K 2105/06; B29K 2105/251
See application file for complete search history.

(56) References Cited

U.S. PATENT DOCUMENTS

| | | | |
|---|---|---|---|
| 6,067,480 | A | 5/2000 | Stuffle et al. |
| 6,070,107 | A | 5/2000 | Lombardi et al. |
| 6,228,923 | B1 | 5/2001 | Lombardi et al. |

(Continued)

FOREIGN PATENT DOCUMENTS

| | | |
|---|---|---|
| JP | 2002-516346 A | 6/2002 |
| JP | 2003-53849 A | 2/2003 |
| JP | 2014-133414 A | 7/2014 |

OTHER PUBLICATIONS

American Lecithin Company, copyright 2000-2003, "Lecithin Applications" accessed at http://www.americanlecithin.com/leci_appfood.html on Jun. 23, 2019 (Year: 2000).*

*Primary Examiner* — Robert S Walters, Jr.
(74) *Attorney, Agent, or Firm* — Venable LLP

(57) ABSTRACT

Provided is a method of producing a three-dimensional object, including: a first step of placing and laminating a water-insoluble structural material and a support material each containing a water-soluble material and a fiber material to form a material layer; and a second step of bringing a portion of the shaped object including the support material into contact with a liquid containing water and a bipolar surfactant to remove the portion.

17 Claims, 5 Drawing Sheets

(56) References Cited

U.S. PATENT DOCUMENTS

| | | |
|---|---|---|
| 6,437,034 B2 | 8/2002 | Lombardi et al. |
| 2015/0314578 A1 | 11/2015 | Taniuchi et al. |
| 2016/0152811 A1* | 6/2016 | Gardner .................. C08L 51/06 524/35 |
| 2017/0015063 A1* | 1/2017 | Hanyu .................. B33Y 10/00 |

* cited by examiner

METHOD OF PRODUCING THREE-DIMENSIONAL OBJECT AND REMOVING LIQUID TO BE USED IN THE PRODUCTION METHOD

BACKGROUND OF THE INVENTION

Field of the Invention

The present invention relates to a method of producing a three-dimensional object and a removing liquid to be used in removal of a support portion in the production method.

Description of the Related Art

In recent years, a laminate shaping method involving laminating shaping material particles in accordance with the section data of a three-dimensional object that one wishes to produce has been attracting attention as a method of producing a three-dimensional object.

In Japanese Patent Application Laid-Open No. 2003-53849, there is a disclosure of a method involving placing powders of shaping materials in accordance with the section data of a three-dimensional object through the use of an electrophotographic system and fusing the powders of the shaping materials with each other with heat to laminate the powders.

When a complex three-dimensional object, such as an overhang structure or a structure with a movable portion, is produced in the laminate shaping method, there arises a need for arranging a structural material on a region where no structural material is present. In such case, at least two kinds of shaping materials, i.e., the structural material constituting the target three-dimensional object and a support material supporting the lamination of the structural material need to be used. A support portion including the support material is arranged in a region serving as a void of the target three-dimensional object in its production process. The support portion is a portion supporting the structural material to be placed on the region where no structural material is present, and is finally removed. Therefore, the support material is desired to be a material that can be easily removed from the surface of a shaped portion including the structural material.

In Japanese Patent Application Laid-Open No. 2002-516346, there is a disclosure of a technology involving using poly(2-ethyl-2-oxazoline), which is a water-soluble organic material, as a support material. When the water-soluble organic material is used as the support material, the support portion can be removed by washing with water.

SUMMARY OF THE INVENTION

An object of the present invention is to provide a method of producing a three-dimensional object improved in removing performance on a support portion including a support material, and a removing liquid to be used in the removal of the support portion in the production method.

A method of producing a three-dimensional object according to one embodiment of the present invention includes: a first step of placing and laminating a water-insoluble structural material, and a support material each containing a water-soluble material and a fiber material to form a material layer to form a shaped object; and a second step of bringing a portion of the shaped object including the support material into contact with a liquid containing water and a bipolar surfactant to remove the portion.

In addition, a removing liquid according to one embodiment of the present invention is a removing liquid for removing the portion in the shaped object including the support material particles in the method of producing a three-dimensional object, the removing liquid including: water; and a bipolar surfactant.

Further features of the present invention will become apparent from the following description of exemplary embodiments with reference to the attached drawings.

DESCRIPTION OF THE EMBODIMENTS

Figure 1A:
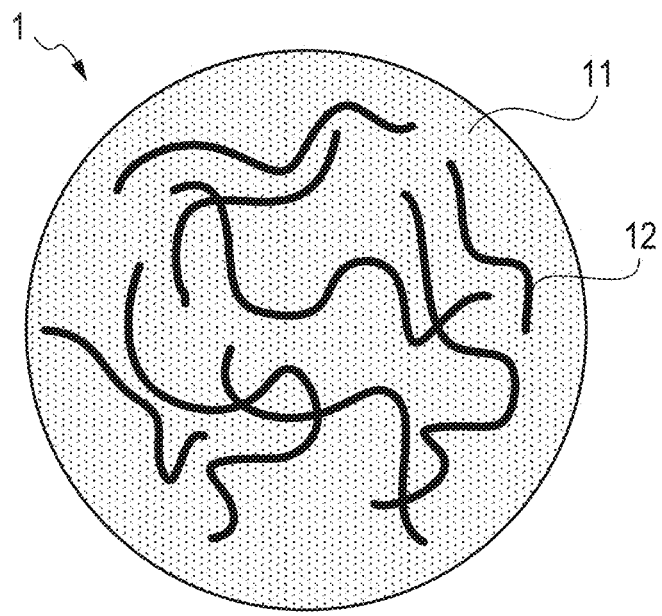
FIG. 1A and FIG. 1B are each a view for schematically illustrating an example of the sectional structure of a support material particle according to this embodiment.

In the laminate shaping method involving using the electrophotographic system disclosed in Japanese Patent Application Laid-Open No. 2003-53849, the powders of the shaping materials are used. Therefore, it is necessary that a structure portion serving as the target three-dimensional object be constituted by using a powder formed of particles of a structural material (structural material particles), and a support portion be constituted by using a powder formed of particles of a support material (support material particles). In this case, both the structural material particles and the support material particles are placed on one section. When the shaping material particles are fused and laminated by heating, the support material particles are heated together with the structural material particles. In general, a water-soluble organic material has a softening temperature lower than that of a water-insoluble structural material, and hence abruptly softens at a temperature equal to or more than the softening temperature. Accordingly, when particles each containing the water-soluble organic material are used as the support material particles, the following problem occurs. The support material particles are more remarkably softened by heating than the structural material particles are, and hence the shape of the support portion largely deviates from an intended shape.

A possible method of solving the problem is to incorporate a water-insoluble additive into each of the support material particles each containing the water-soluble organic material. However, it is more difficult to dissolve such support material particles than the support material particles each including only the water-soluble material disclosed in Japanese Patent Application Laid-Open No. 2002-516346. Accordingly, there is a risk in that it becomes difficult to produce a three-dimensional object having a complex structure, such as an overhang structure or a structure with a movable portion, with high shape accuracy or high dimensional accuracy. There is also a risk in that when an organic solvent, or an acidic or alkaline solvent except water having a large environmental load is used for increasing a dissolution rate, a treatment, such as purification, is needed for the disposal of the solvent after the removal of the support material.

According to the present invention, the support portion including the support material particles is removed by being brought into contact with a liquid containing water and a bipolar surfactant. Accordingly, removing performance on the support portion can be improved, and even when the support material particles each contain a water-insoluble additive, a three-dimensional object can be produced with high shape accuracy and high dimensional accuracy.

An embodiment of the present invention is described in detail below with appropriate reference to the drawings. However, the present invention is not limited to the embodiment to be described below. In the present invention, embodiments obtained by, for example, appropriately changing or modifying the embodiment to be described below based on the ordinary knowledge of a person skilled in the art so that such change or modification may not deviate from the gist thereof are also included in the scope of the present invention.

<<Shaping Material Particles>>

First, shaping material particles to be used in the present invention are described. In the present invention, water-insoluble structural material particles and support material particles each containing a water-soluble material are used as the shaping material particles. The term "shaping material particles" as used herein refers to particulate shaping materials to be used at the time of the production of a three-dimensional object. The shaping materials are classified into a structural material constituting the target three-dimensional object and a support material supporting the lamination of the structural material. A support portion including the support material is a portion supporting the structural material to be laminated on a region where no structural material is present, and is a portion to be finally removed. That is, the "shaping material particles" are classified into the "structural material particles" serving as a particulate structural material and the "support material particles" serving as a particulate support material.

The average particle diameter of the shaping material particles on a volume basis is preferably 1 µm or more and 100 µm or less, more preferably 20 µm or more and 80 µm or less. When the average particle diameter of the shaping material particles is set to 1 µm or more, the thickness of one lamination in a laminating step to be described later can be increased, and hence a three-dimensional object having a desired height can be obtained by a small number of times of lamination. In addition, when the average particle diameter of the shaping material particles is set to 100 µm or less, it becomes easy to produce a three-dimensional object having high shape accuracy and high dimensional accuracy. The average particle diameter of the shaping material particles on a volume basis may be measured with a commercial laser diffraction/scattering particle size distribution-measuring apparatus.

<Structural Material Particles>

A water-insoluble material is used as the structural material constituting the three-dimensional object. In this embodiment, as described later, the three-dimensional object is produced by heating the structural material particles and the support material particles placed in accordance with section data to fuse the particles with each other to laminate the particles. Accordingly, a thermoplastic material, such as a thermoplastic resin, or a metal material or an inorganic material having thermoplasticity, may be suitably used as the structural material particles according to this embodiment. The term "thermoplasticity" refers to the following characteristic: although a material hardly deforms at normal temperature, when the material is heated at a temperature in accordance with the material, the material shows plasticity to be capable of freely deforming, and when the material is then cooled, the material solidifies again.

Examples of the thermoplastic resin include, but not limited to, an acrylonitrile-butadiene-styrene copolymer (ABS), polypropylene (PP), polyethylene (PE), polystyrene (PS), polymethyl methacrylate (PMMA), polyethylene terephthalate (PET), polyphenylene ether (PPE), nylon/polyamide (PA), polycarbonate (PC), polyacetal (POM), polybutylene terephthalate (PBT), polyphenylene sulfide (PPS), polyether ether ketone (PEEK), a liquid crystal polymer (LCP), a fluororesin, a urethane resin, and an elastomer.

In addition, the structural material particles may each further contain a functional substance, such as a pigment or a dispersant, in accordance with a function of the target three-dimensional object.

In the case where the water-insoluble material is used as the structural material, when a material that can be removed with water is used as the support material constituting the support portion, the support portion can be selectively removed from a shaped object after the lamination with water. When the support portion can be removed with water, cost required for the removal of the support portion can be reduced to a low value because water is easily available. Further, water has high safety and a low environmental load, and hence it is extremely preferred to use water in the removal of the support portion.

Here, the term "water-insoluble material" refers to a material having a solubility in water of less than 0.1, and the term "water-soluble material" refers to a material having a solubility in water of 0.1 or more. In addition, the term "solubility in water" refers to a numerical value obtained by representing a mass to be dissolved in 100 g of pure water having a water temperature of 20° C. at one atmospheric pressure in the unit of grams.

<Support Material Particles>

The support material particles according to this embodiment each contain the water-soluble material serving as a material having a large solubility in water and a fiber material.

[Water-Soluble Material]

As the solubility of the water-soluble material that the support material particles each contain in water becomes larger, the dissolution of the water-soluble material in each of the support material particles in water can be more easily performed, and hence the removal of the support portion with water can be more easily performed. A water-soluble organic material serving as an organic material having water solubility, preferably a thermoplastic water-soluble organic material may be used as such water-soluble material. Specific examples of the water-soluble organic material to be preferably used include: water-soluble saccharides, such as a monosaccharide, an oligosaccharide, a polysaccharide, and a dietary fiber that are soluble in water; a polyalkylene oxide; and polyvinyl alcohol (PVA).

Specific examples of the water-soluble saccharides include, but not limited to: a monosaccharide, such as glucose, xylose, or fructose; a disaccharide, such as sucrose, lactose, maltose, trehalose, or isomaltulose (Palatinose (trademark)); a trisaccharide or a tetrasaccharide, such as melezitose, maltotriose, stachyose, nigerotriose, raffinose, or kestose; an oligosaccharide, such as isomaltooligosaccharide, fructooligosaccharide, xylooligosaccharide, soy oligosaccharide, galactooligosaccharide, nigerooligosaccharide, or lactosucrose; a dietary fiber, such as polydextrose or inulin; and a sugar alcohol, such as xylitol, sorbitol, mannitol, maltitol, lactitol, oligosaccharide alcohol, or erythritol.

In addition, specific examples of the polyalkylene oxide include, but not limited to, polyethylene glycol (PEG) and polyethylene oxide (PEO).

In order that the removal of the portion including the support material particles with water may be facilitated, the mass fraction of the water-soluble material with respect to the entirety of the support material particles is preferably 50% or more, more preferably 70% or more. The mass fraction of the water-soluble material with respect to the entirety of the support material particles may be 95% or less, or may be 90% or less, though an upper limit therefor is not particularly limited.

Each of the support material particles may contain one kind of water-soluble material, or may contain a plurality of kinds of water-soluble materials. When the plurality of kinds of water-soluble materials are incorporated, the mass fraction of the water-soluble materials with respect to the entirety of the support material particles only needs to be calculated in terms of the total amount of the water-soluble materials. Here, the "kinds" of the water-soluble materials are determined by their chemical structures, and when the chemical structures are different from each other, the following representation is used: the kinds are different from each other.

Although the water-soluble material is not particularly limited as long as the material has water solubility, a material having a solubility in water of more than 1 is preferred, a material having a solubility in water of more than 10 is more preferred, and a material having a solubility in water of 50 or more is still more preferred.

Various characteristics of each of the support material particles, such as a viscosity and a softening temperature, can be adjusted to desired values by mixing a plurality of materials. For example, the softening temperature of each of the support material particles can be adjusted by using a mixture of maltotetraose and lactitol having a softening temperature lower than that of maltotetraose as a water-soluble material, and adjusting a ratio between maltotetraose and lactitol. In addition, the addition of the fiber material can adjust a viscoelasticity when a material is heated to a temperature equal to or more than its softening temperature. Here, the term "softening temperature" refers to the temperature at which, when a substance is heated, its storage elastic modulus starts to largely reduce in association with an increase in temperature thereof. In this specification, as described in Examples, the temperature at which, in a storage elastic modulus at each temperature that may be measured with a rheometer MCR302 manufactured by Anton Paar, the storage elastic modulus becomes 10 MPa is defined as a softening temperature.

The support material particles may each further contain a functional substance, such as a pigment or a dispersant, in accordance with a function of the target three-dimensional object.

[Fiber-Containing Particles]

The support material particles according to this embodiment each have added thereto the fiber material for adjusting the viscosity of a material at a temperature equal to or more than its softening temperature. The support material particles each containing the fiber material are hereinafter referred to as "fiber-containing particles." The fiber-containing particles according to this embodiment each have such a sectional structure as illustrated in FIG. 1A, a fiber-containing particle 1 has dispersed therein a fiber material 12, and a three-dimensional network structure based on the fiber material 12 is preferably present in the particle. The fiber-containing particle 1 according to this embodiment can inhibit the flow of a water-soluble material 11 in the particle with the fiber material 12, preferably the network structure based thereon. Accordingly, even when the viscosity of the water-soluble material 11 is increased by heating in a heat fusing step, the flow of the water-soluble material 11 is suppressed and hence an increase in viscosity of the entirety of the particle can be suppressed. As a result, in a temperature range in the heat fusing step, values for the storage elastic modulus and loss elastic modulus of the particle can be adjusted. That is, the fiber material 12 functions as a viscoelasticity-controlling agent configured to control the viscoelasticities of the fiber-containing particle 1, such as the storage elastic modulus and the loss elastic modulus.

Here, the term "storage elastic modulus (G')" refers to the extent of the elasticity of a substance. The term "elasticity" generally refers to a property of a solid, and refers to the following property: after a substance has been deformed by applying a certain external force thereto, the removal of the external force returns the shape of the deformed substance to a shape before the application of the external force. Meanwhile, the term "loss elastic modulus (G")" refers to the extent of the viscosity of a substance. The term "viscosity" generally refers to a property of a liquid, and refers to the following property: after a substance has been deformed by applying a certain external force thereto, even the removal of the external force does not return the shape of the deformed substance to a shape before the application of the external force.

When the storage elastic modulus of a substance is larger than its loss elastic modulus in a temperature range, the substance shows elastic behavior in the temperature range. That is, even when an external force is applied to deform the substance, the substance tries to return to its original shape, and hence shows rubber-like behavior. In contrast, when the storage elastic modulus of a substance is smaller than its loss elastic modulus in a temperature range, the substance shows viscous behavior in the temperature range. That is, when an external force is applied to deform the substance, the substance flows and does not return to its original shape, and hence shows sol-like behavior.

In general, the water-soluble material 11, such as a water-soluble saccharide, has a softening temperature lower than that of the structural material serving as a water-insoluble material, and its storage elastic modulus is smaller than its loss elastic modulus in a temperature range of the softening temperature or more.

When the fiber-containing particles 1 are used as the support material particles, the particles are laminated together with the structural material particles. In addition, in the heat fusing step, both the support material particles and the structural material particles are heated and fused to form a layer. As described in detail later, in the heat fusing step, the support material particles and the structural material particles need to be heated to a temperature equal to or more than the temperature at which both the particles soften. Therefore, the water-soluble material 11 is heated to a temperature considerably higher than the softening temperature of the water-soluble material 11 in the heat fusing step, and hence the water-soluble material 11 shows sol-like behavior and its flowability becomes remarkable. As a result, the support material particles each containing the water-soluble material 11 cannot retain their shapes, and hence there is a risk in that the support portion serving as a portion in the layer including the support material particles remarkably deforms.

However, the fiber-containing particle 1 according to this embodiment contains the fiber material 12 in addition to the water-soluble material 11, and hence its storage elastic modulus is adjusted so as to be always larger than its loss elastic modulus in the temperature range in the heat fusing step. Thus, the fiber-containing particle 1 according to this embodiment always shows rubber-like behavior even in the temperature range in the heat fusing step, and hence does not flow but tries to keep its shape. In addition, the fiber material 12 can be dissolved or dispersed in water, and hence can be removed with a liquid containing water and a bipolar surfactant (hereinafter referred to as "removing liquid"). Accordingly, the fiber-containing particles 1 according to this embodiment can be laminated together with the water-insoluble structural material particles while the particles can be removed by being brought into contact with the removing liquid after the lamination.

In addition, when particles each containing the water-soluble material 11 serving as a material having a large solubility in water are exposed to an atmosphere having a high humidity, the particles may absorb moisture in the atmosphere. Then, there is a risk in that the viscosity of each of the particles increases, and hence the particles aggregate or solidify to lose their flowability as a powder. When the powder loses the flowability, it becomes difficult to place the particles based on section data to form one material layer, or the accuracy of the three-dimensional object to be produced is reduced. Accordingly, the humidity of the environment under which the particles are stored or the environment under which the particles are used needs to be strictly controlled, and hence cost for the production of the three-dimensional object increases.

However, in the fiber-containing particle 1 according to this embodiment, even when the water-soluble material 11 in the fiber-containing particle 1 absorbs moisture and hence its storage elastic modulus reduces, the flow of the water-soluble material 11 is inhibited by the network structure of the fiber material 12. Thus, the loss of the flowability of the fiber-containing particles 1 serving as a powder can be suppressed.

As a result, the following support material particles can be achieved: while each of the support material particles has excellent moisture resistance in a particle state, the particles can be removed by being brought into contact with the removing liquid after the formation of the three-dimensional object. The fiber-containing particle 1 according to this embodiment brings together contradictory material characteristics, i.e., moisture resistance and water solubility. Accordingly, it is easy to handle the particle in a particle state, and even when no humidity control is performed, a state suitable for a laminate shaping method can be maintained. In addition, when the fiber-containing particles 1 according to this embodiment are used as the support material particles, a three-dimensional object having high accuracy can be produced.

(Fiber Material)

The fiber material 12 preferably has a storage elastic modulus larger than the storage elastic modulus of the water-soluble material 11 in the temperature range in the heat fusing step. Here, when the fiber-containing particle 1 contains a plurality of kinds of water-soluble materials, the phrase "larger than the storage elastic modulus of the water-soluble material" means that the storage elastic modulus of the fiber material 12 is larger than the storage elastic modulus of each of the water-soluble materials in the fiber-containing particle 1. The incorporation of the fiber material 12 serving as a material having a storage elastic modulus larger than that of the water-soluble material 11 into the fiber-containing particle 1 can improve the storage elastic modulus of the entirety of the fiber-containing particle 1. In addition, the fiber material 12 is preferably such a material that its storage elastic modulus is larger than its loss elastic modulus in the temperature range in the heat fusing step.

Further, the softening temperature of the fiber material 12 is preferably higher than the softening temperature of the water-soluble material 11. Here, when the fiber-containing particle 1 contains a plurality of kinds of water-soluble materials, the phrase "higher than the softening temperature of the water-soluble material" means that the softening temperature of the fiber material 12 is higher than the softening temperature of each of the water-soluble materials in the fiber-containing particle 1. When the softening temperature of the fiber material 12 is set to be higher than the softening temperature of the water-soluble material 11, the softening temperature of the entirety of the fiber-containing particle 1 can be adjusted. In addition, the softening temperature of the fiber material 12 is preferably higher than an upper limit value for the temperature range in the heat fusing step. Thus, a reduction in storage elastic modulus of the fiber-containing particle 1 can be suppressed by the fiber material 12 throughout the heat fusing step.

In addition, the fiber material 12 is more preferably a fibrous organic matter having a hydroxyl group. This is because of the following reason: the fibrous organic matter has flexibility, and hence when the matter is used as the fiber material 12, the network structure based on the fiber material 12 can be more uniformly formed in the fiber-containing particle 1. As a result, the viscoelasticities of the fiber-containing particle 1 can be more effectively controlled.

It is preferred that the fiber material 12 be substantially uniformly distributed in the fiber-containing particle 1. When the fiber material 12 is unevenly distributed in the fiber-containing particle 1, viscoelasticity unevenness occurs in the fiber-containing particle 1. As a result, there is a risk in that irregularities occur on the upper surface or lower surface of the layer after the heat fusion. In view of the foregoing, in order that the flatness of each of the upper surface and lower surface of the layer after the heat fusion may be improved, it is preferred that the distribution of the fiber material 12 in the fiber-containing particle 1 be substantially uniform. In addition, for the same reason, it is preferred that the fiber material 12 be also substantially uniformly distributed between a plurality of particles.

Accordingly, the fiber material 12 preferably has a size that is sufficiently small as compared to the particle diameter of the fiber-containing particle 1. The fiber material 12 is particularly preferably nanofibers. The term "nanofibers" as used herein refers to a fibrous material having an average fiber diameter of a submicron size or a nanosize.

The average fiber diameter of the nanofibers to be used in this embodiment is preferably 1 nm or more and 500 nm or less, more preferably 1 nm or more and 100 nm or less, particularly preferably 1 nm or more and 50 nm or less. In addition, the length of each of the nanofibers is preferably 4 times or more, more preferably 10 times or more, still more preferably 50 times or more as large as the average fiber diameter. When the length of each of the nanofibers is set to be sufficiently large as compared to the average fiber diameter, such network structure in the fiber-containing particle 1 as described above can be uniformly formed.

In addition, as described in the foregoing, the average diameter of the support material particles is preferably set to 100 μm or less, and hence the length of each of the nanofibers is also preferably set to a length in accordance therewith. Specifically, the length of each of the nanofibers is preferably 100 μm or less, more preferably 50 μm or less, particularly preferably 30 μm or less. The length of each of the nanofibers is preferably 1 μm or more, more preferably 5 μm or more, though a lower limit value therefor is not particularly limited.

In order that the viscoelasticities of the entirety of the fiber-containing particle 1 may be effectively controlled by the fiber material 12, it is preferred that in the temperature range in the heat fusing step, the fiber material 12 not react with the water-soluble material 11 or be not compatible therewith, and the fiber material 12 itself not alter. In addition, the fiber material 12 is preferably a material having a solubility in water smaller than that of the water-soluble material 11, and the fiber material 12 is preferably a water-insoluble material (material having a solubility in water of less than 0.1). Here, when the fiber-containing particle 1 contains a plurality of kinds of water-soluble materials, the phrase "smaller than the solubility of the water-soluble material in water" means that the solubility of the fiber material 12 in water is smaller than the solubility of each of the water-soluble materials in the fiber-containing particle 1 in water. Thus, even when the water-soluble material 11 absorbs moisture and hence its viscosity increases, a change in viscoelasticity of the fiber material 12 can be suppressed. As a result, an increase in viscosity of the fiber-containing particle 1 can be suppressed. Examples of such material include a cellulose fiber and a chitin fiber.

In addition, the fiber material 12 is preferably a material that is dispersible in water. As described later, in the step of removing the support portion, the water-soluble material 11 is dissolved in the removing liquid by bringing the shaped object with the support portion into contact with the removing liquid. At this time, the fiber material 12 that has constituted the fiber-containing particle 1 does not dissolve in water and hence remains. However, a region where the water-soluble material 11 has been present becomes a void, and hence the fiber material 12 is washed away and removed by the removing liquid. At this time, when the fiber material 12 is a material that is dispersible in water, the fiber material 12 can be more easily removed.

Therefore, it is particularly preferred that the fiber material 12 be a water-insoluble material and be a material that is dispersible in water. Such material is, for example, water-insoluble nanofibers. Specifically, cellulose nanofibers or chitin nanofibers are preferably used as the fiber material 12, and the cellulose nanofibers are particularly preferably used as the material. One kind of those nanofibers may be used alone as the fiber material 12, or a composite obtained by combining two or more kinds thereof may be used as the material.

The mass fraction of the fiber material 12 with respect to the fiber-containing particle 1 may be arbitrarily adjusted in accordance with the kind of the water-soluble material 11 and the mass fraction of the water-soluble material 11 with respect to the particle. At that time, the mass fraction of the fiber material 12 is preferably adjusted so that the storage elastic modulus of the fiber-containing particle 1 may exceed the loss elastic modulus of the fiber-containing particle 1 in the temperature range in the heat fusing step.

However, as described above, the support portion formed by laminating the fiber-containing particle 1 is removed by bringing the shaped object with the support portion into contact with the removing liquid in the step of removing the support portion to be described later. The removal of the support portion is advanced by the dissolution of the water-soluble material 11 in the removing liquid, and hence when the ratio of the fiber material 12 with respect to the entirety of the fiber-containing particle 1 is excessively large, it becomes difficult to remove the support portion with the removing liquid. Accordingly, the mass fraction of the fiber material 12 with respect to the entirety of the fiber-containing particle 1 is preferably less than 50 mass %, more preferably 30 mass % or less. In addition, when the amount of the fiber material 12 is excessively small, it becomes difficult to form the three-dimensional network structure based on the fiber material 12 in the fiber-containing particle 1, and hence it becomes difficult to control the storage elastic modulus and loss elastic modulus of the fiber-containing particle 1 with the fiber material 12. Accordingly, the mass fraction of the fiber material 12 with respect to the entirety of the particle 1, which is not particularly limited, is preferably 10 mass % or more. Therefore, the content of the fiber material 12 is preferably 10 mass % or more and less than 50 mass % when the total mass of the particle 1 is defined as 100 mass %.

As an example, the case where maltotetraose and lactitol are each used as the water-soluble material 11, and cellulose nanofibers are used as the fiber material 12 is described. In this case, when the temperature range in the heat fusing step is set to 140° C. or more and 180° C. or less, the mass fraction of the cellulose nanofibers serving as the fiber material 12 is preferably set to 15 mass % or more and less than 50 mass %, and is more preferably set to 15 mass % or more and 30 mass % or less.

Further, the fiber material 12 is preferably a material showing a small change in loss elastic modulus due to water incorporation. Thus, even when the water-soluble material 11 in the fiber-containing particle 1 contains water and hence the loss elastic modulus of the water-soluble material 11 reduces, a change in loss elastic modulus of the fiber material 12 due to water incorporation is small, and hence a reduction in loss elastic modulus of the entirety of the fiber-containing particle 1 can be suppressed. A water-insoluble fiber material is preferably used as the fiber material 12 because the change in loss elastic modulus of the fiber material 12 due to water incorporation can be regarded as substantially zero.

[Viscoelasticities of Support Material Particles]

The storage elastic modulus of each of the support material particles is preferably equal to or more than the storage elastic modulus of each of the structural material particles in the temperature range in the heat fusing step.

When the storage elastic modulus of each of the support material particles is smaller than the storage elastic modulus of each of the structural material particles to be laminated together therewith, there is a risk in that only the support material particles largely deform in the heat fusing step or the laminating step. When the deformation enlarges, the height of a layer formed by the fusion of material layers does not become constant, and hence irregularities occur on the upper surface or lower surface of the layer. When the irregularities occur on the upper surface or lower surface of the layer, the irregularities are responsible for "falling out" at the time of the lamination of the layer on a shaped object or at the time of the lamination of the next layer on the layer. As a result, for example, part of the shaped object chips and hence a three-dimensional object of a desired shape cannot be obtained.

For example, the storage elastic modulus of each of the support material particles is preferably 0.1 MPa or more in the temperature range in the heat fusing step. Thus, a situation where the support material particles remarkably soften to flow out in the heat fusing step can be suppressed.

In addition, it is particularly preferred that also at a temperature equal to or less than a lower limit value for the temperature range in the heat fusing step, the storage elastic modulus of each of the support material particles be equal to or more than the storage elastic modulus of each of the structural material particles to be laminated together therewith. This is because of the following reason. The support material particles constitute a support portion supporting, for example, the overhang portion of a structure portion in an intermediate shaped object after the lamination. Accordingly, when the storage elastic modulus of each of the support material particles is smaller than the storage elastic modulus of each of the structural material particles, there is a risk in that the structure portion to be laminated on the support portion cannot be supported by the support portion. As a result, the structure of the intermediate shaped object after the lamination or a three-dimensional object is deflected or caused to fall by gravity, and hence the shape of the three-dimensional object changes. Meanwhile, when the storage elastic modulus of each of the support material particles is set to be equal to or more than the storage elastic modulus of each of the structural material particles also at a temperature equal to or less than the lower limit value for the temperature range in the heat fusing step, such change in shape of the three-dimensional object as described above can be suppressed, and hence a three-dimensional object having higher shape accuracy and higher dimensional accuracy can be produced.

[Shell]

Each of the support material particles according to this embodiment preferably further has a shell covering at least part of the surface of the particle. Description is given below by taking the fiber-containing particles as an example. The fiber-containing particle 1 according to this embodiment has a sectional structure illustrated in FIG. 1B, and further has a shell 13 covering at least part of the surface of a particle having the water-soluble material 11 and the fiber material 12. At this time, the solubility of the shell 13 in water is smaller than the solubility of the water-soluble material 11 in water. In addition, the shell 13 may include a plurality of kinds of materials. A material to be incorporated in the largest amount into the shell 13 is preferably a material having a solubility in water of less than 10, more preferably a material having a solubility in water of less than 5, still more preferably a material having a solubility in water of 1 or less.

Figure 1B:
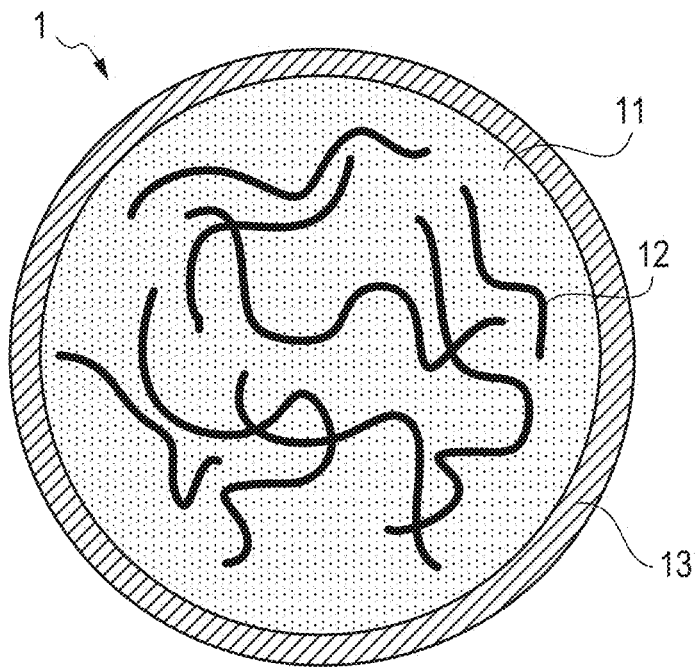

When the fiber-containing particle 1 has such structure as illustrated in FIG. 1B, support material particles that can be removed with the removing liquid after the lamination while each having excellent moisture resistance in a particle state can be achieved for the following reason.

Even when the fiber-containing particle 1 according to this embodiment is placed under an atmosphere having a large moisture content, such as a high-humidity environment, an increase in viscosity of the surface of the fiber-containing particle 1 due to moisture in the atmosphere is suppressed by the presence of the shell 13. Accordingly, aggregation in association with an increase in viscosity of the fiber-containing particle 1 is suppressed. Accordingly, the fiber-containing particle 1 according to this embodiment can maintain a state suitable for a laminate shaping method even when no particular humidity control is performed.

In a production process for the three-dimensional object, in the heat fusing step of fusing the support material particles and the structural material particles with each other, the particles are fused by the disappearance of an interface between the particles, and hence a layer (sheet) and a shaped object are formed. At this time, in an interface portion between the respective particles, in order that the total energy of a system may be reduced, a reducing action on an interface between dissimilar substances different from each other in physical property or material acts to cause the movement of a molecule (atom). As a result, the molecules of the water-soluble material 11 in the plurality of fiber-containing particles 1 gather to form the network of the water-soluble material 11. At this time, the shell 13 is broken because the volume ratio of the shell 13 in the fiber-containing particle 1 is sufficiently small as compared to the volume ratio of the water-soluble material 11 in the fiber-containing particle 1. That is, the support portion is formed in a state in which the fiber material 12 and a fragment of the shell 13 are dispersed in the network of the water-soluble material 11. Therefore, the support portion formed by the fiber-containing particle 1 according to this embodiment can be easily removed from the shaped object by bringing the network of the water-soluble material 11 into contact with water.

Examples of the material to be incorporated in the largest amount into the shell 13 include, but not limited to, organic matters typified by an organic compound and a polymer compound, inorganic matters typified by a metal and a ceramic, and composites thereof.

Examples of the organic matter include, but not limited to: resin substances, such as a vinyl resin, a polyester resin, an epoxy resin, and a urethane resin; ester compounds, such as a glycerin fatty acid ester, a sucrose fatty acid ester, and a sorbitan fatty acid ester; and some of cellulose derivatives, such as ethyl cellulose.

Examples of the inorganic matter include, but not limited to, inorganic oxides, such as silicon oxide, titanium oxide, and alumina.

A main component of the water-soluble material 11 and a main component of the shell 13 are preferably different from each other. When the main components of the water-soluble material 11 and the shell 13 are different from each other, the mixing of the water-soluble material 11 and the shell 13 is suppressed at the time of the fusion of the fiber-containing particles 1, and hence the effects of the present invention are easily obtained.

<Glass Transition Temperature, Softening Temperature, and Melting Temperature of Each of Shaping Material Particles>

The glass transition temperature, softening temperature, and melting temperature of each of the shaping material particles, which may be appropriately selected in accordance with a heat fusion temperature, are preferably 40° C. or more and 300° C. or less. When the temperatures are 40° C. or more, the three-dimensional object to be obtained hardly deforms owing to the temperature of its surrounding environment, and when the temperatures are 300° C. or less, control in the heat fusing step becomes easy.

<Method of Producing Shaping Material Particles>

A method of producing the shaping material particles according to this embodiment is not particularly limited. Examples of a production method for obtaining the fiber-containing particles 1 include the following methods.

A first method is a method involving dispersing the fiber material 12 in a solution containing the water-soluble material 11 to provide a raw material liquid, spraying the raw material liquid in a gas, and rapidly drying the liquid to provide the fiber-containing particles 1 (spray drying method). The method is preferred because the average particle diameter and circularities of the fiber-containing particles 1 can be made relatively uniform.

A second method is a method involving melting and kneading the water-soluble material 11 and the fiber material 12 to provide a solid matter, and pulverizing the resultant solid matter to provide the fiber-containing particles 1 (kneading pulverization method). According to the method, the fiber-containing particles 1 can be produced at low cost.

As other methods, the fiber-containing particles 1 may be produced by using, for example, a mechanical pulverization method, or a melting dispersion cooling method involving dispersing raw materials in molten states in a medium, and cooling the resultant to provide the particles.

The shaping material particles 1 according to this embodiment have been described above, but the present invention is not limited thereto and can be applied also to a form except a particle. That is, the above-mentioned thermoplastic composition itself is also included in the present invention. Specific examples of the form of the thermoplastic composition except a particle form include, but not particularly limited to, forms such as a pellet form, a rod form, and a filament form.

<<Method of Producing Three-Dimensional Object>>

Next, an example of a method of producing a three-dimensional object of the present invention based on a laminate shaping method is described.

The method of producing a three-dimensional object according to this embodiment includes the following steps [1] to [3]:

[1] a first step (material layer-forming step) of placing water-insoluble structural material particles, and support material particles each containing a water-soluble material and a fiber material at respective predetermined positions on a layer carrier to form a material layer;

[2] a second step (laminating step) of heating the material layer, followed by the lamination of a plurality of the material layers to form a shaped object; and

[3] a third step (removing step) of bringing a portion of the shaped object formed by the support material particles into contact with a removing liquid to remove the portion.

The term "shaped object" as used herein refers to a three-dimensional object in a state of having, in a portion (cavity portion) that should be a space in the target three-dimensional object, the portion (support portion) formed by the support material particles.

When the removing step [3] is performed by bringing the support portion of the shaped object, which is obtained by repeating the material layer-forming step [1] and the laminating step [2] to laminate a required number of the material layers, into contact with the removing liquid, the support portion can be selectively removed and hence the target three-dimensional object can be obtained.

Each step is described in detail below.

[1] Material Layer-Forming Step

This step is a step of placing the structural material particles and the support material particles in accordance with the section data of the target three-dimensional object.

In the formation of a material layer, the material layer may be formed by drawing the shaping material particles in dots, or the material layer may be formed by drawing the particles in lines or surfaces. Of those, the method involving drawing the particles in lines or surfaces is preferred from the viewpoint of a shaping speed. The method involving drawing the particles in lines or surfaces to form the material layer is, for example, a method involving using an electrophotographic system or using an inkjet system like Japanese Patent Application Laid-Open No. 2014-133414.

A known method, such as a method of forming a material layer involving utilizing an electrostatic action based on charging, may be used in the formation of a material layer by drawing in lines or surfaces. When a material layer containing a plurality of kinds of shaping material particles is formed like this embodiment, the electrophotographic system involving utilizing an electrostatic force is preferred from the viewpoint that the accuracy with which shaping material particles of different kinds are placed is high.

When the fiber-containing particles according to this embodiment are applied to the laminate shaping method of the electrophotographic system, the attenuation of charging, which is a problem peculiar to shaping material particles each containing a water-soluble material, can be suppressed. In general, the shaping material particles each containing a water-soluble material are liable to absorb moisture in their surrounding gas, and hence the viscosity of each of the shaping material particles is liable to increase. Accordingly, the flowability of the particles serving as a powder reduces and hence the number of times of contact between the particles reduces. Therefore, the charging attenuates.

However, the fiber-containing particles according to this embodiment each contain the fiber material in addition to the water-soluble material, and hence an increase in viscosity of each of the fiber-containing particles due to moisture absorption can be suppressed. Accordingly, the flowability of the particles serving as a powder is maintained and hence the number of times of contact between the particles does not reduce. Therefore, the attenuation of the chargeability of each of the particles can be suppressed.

Figure 2:
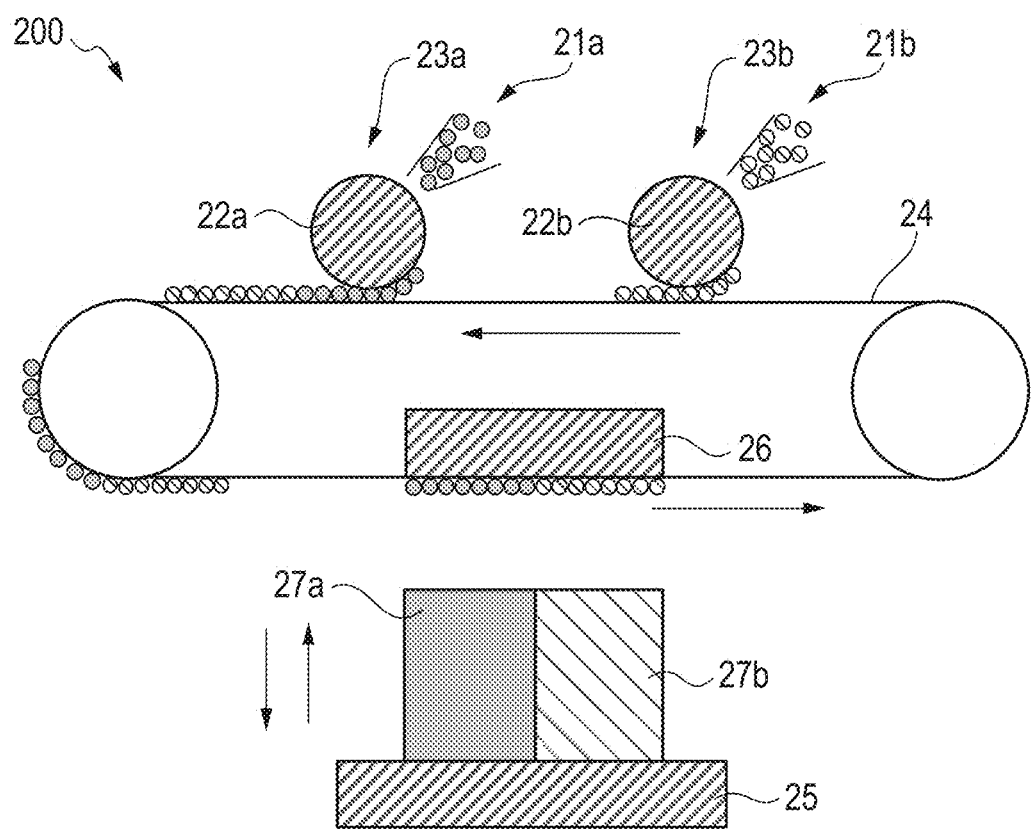
FIG. 2 is a view for schematically illustrating the construction of a three-dimensional shaping apparatus according to this embodiment.

A step of forming a material layer by the electrophotographic system is described as an example of the material layer-forming step [1] with reference to FIG. 2. FIG. 2 is a view for schematically illustrating the construction of a three-dimensional shaping apparatus using the electrophotographic system.

A three-dimensional shaping apparatus 200 (hereinafter referred to as "apparatus 200") according to this embodiment includes: developing apparatus 21a and 21b; image-bearing members 22a and 22b; exposing apparatus 23a and 23b; an intermediate carrying/conveying belt 24; a stage 25; and a temperature control unit 26. The stage 25 is movable in a direction shown by arrows (a direction for the material layers to be laminated), whereby the material layer on the intermediate carrying/conveying belt 24 can be brought in contact with the stage 25 or the shaped object on the stage 25. In the material layer-forming step [1] in the method of producing a three-dimensional object according to this embodiment, first, a particle image based on the structural material particles is formed on the image-bearing member 22a, and a particle image based on the support material particles is formed on the image-bearing member 22b. Then, those particle images are transferred onto the intermediate carrying/conveying belt 24 to form a material layer including the structural material particles and the support material particles.

The step of forming a material layer is described in detail below.

First, the surfaces of the image-bearing members 22a and 22b are each uniformly charged with a charging apparatus (not shown). A method for the charging is not particularly limited.

The charged image-bearing members 22a and 22b are exposed to light with the exposing apparatus 23a and 23b in accordance with the slice data (section data) of the three-dimensional object to be produced. Thus, electrostatic latent images are formed on the surfaces of the image-bearing members 22a and 22b. Specifically, the electrostatic latent image of a structure portion region in the slice data of the three-dimensional object to be produced is formed on the image-bearing member 22a, and the electrostatic latent image of a support portion region therein is formed on the image-bearing member 22b.

Subsequently, the shaping material particles are supplied from the developing apparatus 21a and 21b to the image-bearing members 22a and 22b. Thus, the particles are placed on one of a region on each of the surfaces of the image-bearing members 22a and 22b where an electrostatic latent image has been formed, and a region thereon where no electrostatic latent image has been formed. Thus, the electrostatic latent images are visualized, and hence the particle image based on the structural material particles can be formed on the surface of the image-bearing member 22a and the particle image based on the support material particles can be formed on the surface of the image-bearing member 22b. That is, the material layer-forming step [1] includes a step of developing the electrostatic latent images formed on the image-bearing members with the structural material particles and the support material particles to form the particle images.

After that, the respective particle images placed on the image-bearing members 22a and 22b are each transferred onto the intermediate carrying/conveying belt 24 at a predetermined timing. Thus, a material layer formed of the particle image based on the structural material particles and the particle image based on the support material particles can be formed. That is, the material layer is formed by transferring, onto a transfer member onto which a first layer obtained by placing one of the structural material particles and the support material particles has been transferred, a second layer obtained by placing the other particles. A known transfer method, such as electrostatic transfer involving utilizing electrostatic energy, may be used at the time of the transfer onto the transfer member. The order in which the particle images are transferred onto the intermediate carrying/conveying belt 24 is not particularly limited, and the particle image formed of the support material particles may be transferred after the particle image formed of the structural material particles has been transferred, or the particle images may be transferred in the order reverse to the foregoing.

[2] Laminating Step

This step is a step of repeatedly laminating the material layer formed in the preceding step to form a shaped object. In the lamination of material layers, a material layer formed as a separate body may be laminated on the surface of a material layer formed in advance, or a new material layer may be directly formed and laminated on the surface of the material layer formed in advance. In addition, when the material layer formed as a separate body is laminated on the surface of the material layer formed in advance, the material layer formed as a separate body may be transferred onto the surface of the material layer formed in advance after the former material layer has been formed on a base material once. The base material to be used at this time is referred to as "transfer member." When the material layer is transferred onto the transfer member, a known transfer method, such as electrostatic transfer involving utilizing electrostatic energy, may be used.

An example of the laminating step [2] is described below with reference to FIG. 2. Although a system for the material layer-forming step [1] is not particularly limited, description is given here on the assumption that the step is performed by the electrophotographic system.

The material layer formed on the intermediate carrying/conveying belt 24 is moved to a lamination position by the rotation of the intermediate carrying/conveying belt 24. When the material layer is moved to the lamination position, the material layer is heated by the temperature control unit 26 and hence the particles constituting the material layer are fused with each other. Then, the layer is transferred and laminated onto the upper surface of the stage 25 or onto the shaped object in the middle of its production on the stage 25. At this time, a region formed of the structural material particles out of the material layer is laminated to form a portion (structure portion 27a) constituting the three-dimensional object, and a region formed of the support material particles out of the layer is laminated to form a support portion 27b. That is, the laminating step in the method of producing a three-dimensional object according to this embodiment includes a heat fusing step of applying thermal energy to the material layer to fuse the shaping material particles in the material layer.

The timing at which the particles constituting the material layer are fused with each other by heating the material layer is not particularly limited, and the fusion may be performed at any one of the following timings: before the lamination, simultaneously with the lamination, and after the lamination. Alternatively, the fusion may be performed at two or more of the timings.

In addition, in the heat fusing step, both the structural material particles and the support material particles in the material layer are heated by the temperature control unit 26, and the temperatures of the particles are controlled to substantially equal temperatures. At this time, the temperature control unit 26 preferably performs the heating at the temperature at which both the structural material particles and the support material particles soften. Therefore, when the softening temperatures of the structural material particles and the support material particles are different from each other, the temperature control unit 26 preferably performs the heating at a temperature equal to or more than the higher one of the temperatures.

Accordingly, when the softening temperatures of the structural material particles and the support material particles are largely different from each other, and their storage elastic moduli are also largely different from each other, hardness unevenness occurs in the material layer. Further, when the storage elastic moduli are remarkably reduced by the softening of the particles, a portion formed of the particles that have become relatively soft deforms, and hence a shape change, such as a depression or collapse, occurs in the material layer. As a result, there occurs a problem in that it becomes difficult to laminate both the structural material particles and the support material particles.

The problem becomes particularly remarkable when the support material particles each contain a water-soluble material, especially a water-soluble organic material. That is, when the support material particles each contain the water-soluble material, the softening temperature of the support material generally becomes lower than the softening temperature of each of the structural material particles. Accordingly, when the support material particles are heated to the softening temperature of each of the structural material particles, the support material particles are heated to a temperature largely exceeding the softening temperature of each of the particles, and hence the support material particles remarkably soften.

However, the fiber-containing particles to be used as the support material particles are each suppressed in viscoelasticity change due to water incorporation by the fiber material 12 therein, and hence the problem can be solved.

[3] Removing Step

This step is a step of removing the portion (support portion) formed of the support material particles out of the shaped object. The removal of the support portion is performed by bringing the shaped object into contact with the removing liquid.

In particular, when the fiber-containing particles are used as the support material particles, once the support portion is brought into contact with water, the molecules of the fiber material are entangled with each other to gel with respect to water, and hence the gelled material covers the surface of the support portion to form a barrier layer against water in some cases. For example, in the case where the fiber material is cellulose nanofibers, such phenomenon is considered to be because of the following reason.

A glucose unit constituting cellulose nanofibers in the support material particles has a chair conformation. Only C and H are placed in a direction vertical to a pyranose ring constituting glucose, and a hydroxyl group is placed in a direction horizontal thereto. By virtue of such structure, cellulose is hydrophobic in the vertical direction and is hydrophilic in the horizontal direction, and hence both a hydrophobic moiety and a hydrophilic moiety are localized in glucose. When the cellulose nanofibers in a state of being dispersed in water are dried by removing water therefrom in order that the support material particles may be formed, hydroxyl group portions are subjected to hydrogen bonding, and hence the fibers are strongly bonded to each other.

Therefore, in the case where the support portion is immersed in a solvent containing water, the hydroxyl group portions of the dried fibers in the support material particles are strongly subjected to hydrogen bonding, and hence even when the fibers contain moisture, the fibers form a gel-like barrier layer without being loosened. It is conceivable that this phenomenon is applied to other fibrous organic matter having a hydroxyl group.

When the barrier layer is formed, it becomes difficult to remove the support material particles of, in particular, the support portion in a minute region (e.g., a gap of a fin shape). Accordingly, there is a risk in that it takes much time to remove the support portion and hence productivity is remarkably impaired. However, the incorporation of a bipolar surfactant into the removing liquid can prevent the gelation. The bipolar surfactant shows an amphipathic characteristic because the surfactant has, in a molecule thereof, a hydrophobic hydrocarbon chain (nonpolar portion) and a hydrophilic polar group (polar portion). The characteristic has an action of reducing an interfacial tension between the hydrophilic moiety and the hydrophobic moiety to stabilize an emulsion system. Therefore, when the dried fibrous organic matter having a hydroxyl group are immersed in a solvent having dispersed therein the bipolar surfactant, such as lecithin, the lecithin may enter the hydrophilic moiety and the hydrophobic moiety in fibrous organic matter having a hydroxyl group to loosen the bonding between the fibers to disperse the fibers. Accordingly, the barrier layer is not formed and hence the removing liquid is always brought into contact with the support portion. Therefore, the speed at which the support material is removed can be increased even in a minute gap.

Lecithin may be suitably used as the bipolar surfactant. Vegetable lecithin or animal lecithin may be used as the lecithin. Specifically, lecithin purified from a soybean, an oilseed rape, or a sunflower may be used as the vegetable lecithin, and lecithin purified from yolk may be used as the animal lecithin. In addition to the foregoing, surfactants, such as an alkyl dimethylamine oxide and an alkyl carboxybetaine, are each available as the bipolar surfactant. The content of the bipolar surfactant is preferably 0.01% or more on a mass basis. Although an upper limit for the content is not particularly specified, the content is preferably such that the bipolar surfactant is uniformly dispersed in the removing liquid.

The removing step [3] is not particularly limited as long as the support portion can be removed by being brought into contact with the removing liquid. Such method is, for example, a method involving immersing the shaped object in the removing liquid.

Although the removing liquid is not particularly limited as long as the liquid contains water and the bipolar surfactant, the liquid may be, for example, a liquid obtained by mixing water with any other material, such as a material configured to adjust a pH. In such case, the amount of the other material, such as the material configured to adjust a pH, is preferably within 5% of that of water on a mass basis.

Figure 3:
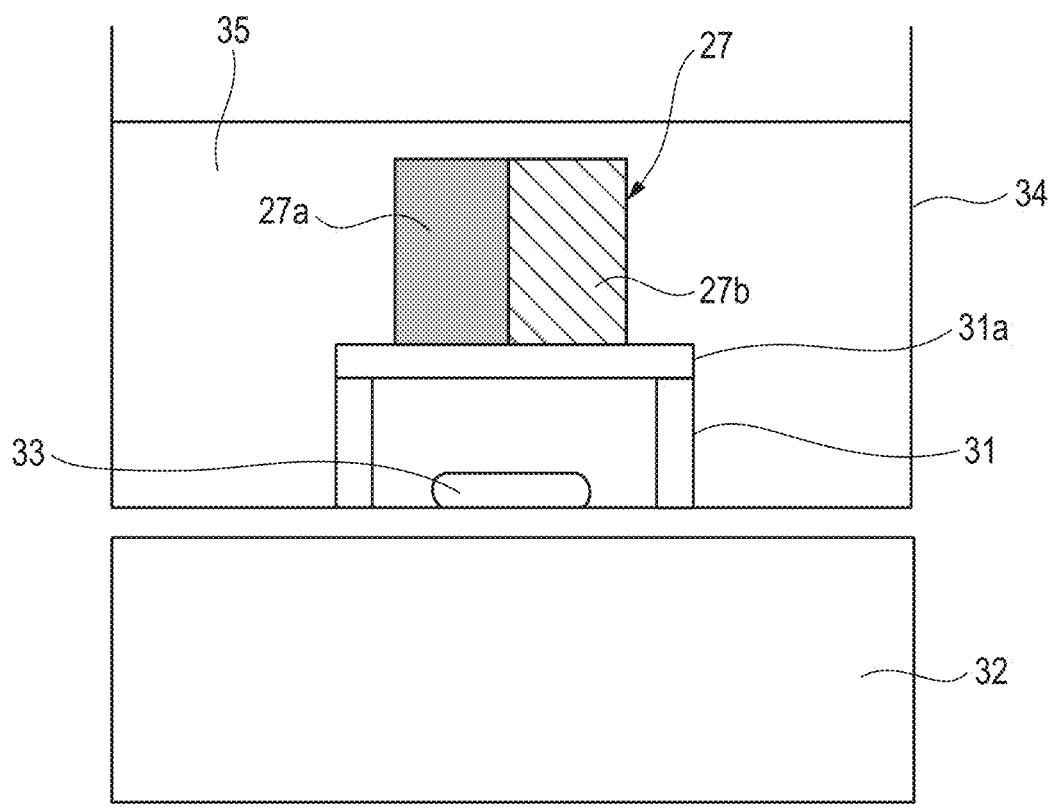
FIG. 3 is a view for schematically illustrating the construction of a removing apparatus to be used in a removing step according to this embodiment.

A specific example of the method involving immersing the shaped object in the removing liquid is described with reference to FIG. 3. FIG. 3 is a view for schematically illustrating the construction of a removing apparatus configured to remove the support portion 27b from an intermediate shaped object 27. The removing apparatus includes: a base 31 on which the shaped object 27 is to be mounted; a magnetic stirrer main body 32; and a magnetic stirrer stirring bar 33.

The magnetic stirrer stirring bar 33 is rotated by the magnetic stirrer main body 32 to stir a removing liquid 35 loaded into a container 34 of the removing apparatus. The support portion 27b of the shaped object 27 is a portion using a water-soluble material as a main component. Accordingly, the support portion 27b is dissolved by being brought into contact with the removing liquid 35, and hence the portion is removed. A stage portion 31a of the base 31 is preferably of a mesh shape so that a water flow may evenly collide with the intermediate shaped object 27. In addition, in the removing step, for example, the temperature of the removing liquid 35 may be controlled (by heating or the like) or ultrasonic vibration may be applied to the removing liquid 35 for the purpose of increasing the speed at which the support portion 27b is removed from the shaped object 27. The support portion 27b may also be removed by the following procedure: the intermediate shaped object 27 is merely immersed in the removing liquid 35 and left at rest, and is then left to stand for a certain time period.

Although the temperature of the removing liquid is not particularly limited, when the liquid is in a warmed state, a dissolution rate increases and hence the support portion can be removed more rapidly. Although the temperature of the removing liquid is preferably from about 60° C. to about 80° C., an upper limit temperature is determined by the heat-resistant temperature of the structural material. For example, in the case where the structural material is ABS or PP, when the temperature is increased to 100° C., there is a risk in that the three-dimensional object is deformed by heat. Accordingly, the temperature of the removing liquid is preferably reduced to a temperature equal to or less than the deflection temperature under load of the structural material.

In addition, the output of the ultrasonic vibration is preferably adjusted in accordance with the shape of the target three-dimensional object. When the number of fine shaped portions is large, unless the vibration is applied with its output reduced, the shaped portions may be damaged by an ultrasonic wave. Accordingly, the output is preferably reduced so that the three-dimensional object may not be damaged.

In addition, in the case where the support portion 27b is removed more rapidly, the removing liquid 35 may be injected from the nozzle (not shown) of a spray or the like to be sprayed on the shaped object 27. In that case, the removing liquid 35 is preferably sprayed at such a water pressure or flow rate that the structure portion 27a is not damaged. A plurality of nozzles may be used or the nozzle may be configured to be movable with respect to the shaped object 27 for uniformly spraying the removing liquid 35 on the shaped object 27. A general nozzle for a spray may be used as the nozzle. The apertures and number of the nozzles may be appropriately selected in accordance with the size of the target shaped object 27 and the kinds of the support material particles.

In order that the support portion 27b may be rapidly removed, the support portion 27b is preferably of a structure having a continuous hole serving as a passage for the removing liquid, and is particularly preferably of a cubic lattice structure.

Examples are described below but the present invention is not limited by Examples.

Preparation Example 1: Preparation of Fiber-Containing Particles 2.80 Kilograms of maltotetraose (NISSHOKU FUJIO-LIGO #450, manufactured by Nihon Shokuhin Kako Co., Ltd.) and 1.20 kg of lactitol anhydrate LC-0 (manufactured by B Food Science Co., Ltd.) were used as water-soluble materials. In addition, 1 kg of cellulose nanofibers (manufactured by Daicel FineChem Ltd.) were used as a fiber material. 5 Kilograms of a dispersion liquid containing water and the cellulose nanofibers at a mass ratio of 80:20 (CELISH, manufactured by Daicel FineChem Ltd.) was used as the cellulose nanofibers.

A dispersion liquid was prepared by dissolving or dispersing the water-soluble materials and the fiber material in 7.67 kg of water, and particles were produced with a spray drying apparatus by a spray drying method. The resultant particles were classified to provide fiber-containing particles having an average particle diameter of 45 μm.

The measurement of the average particle diameter was performed with a laser diffraction/scattering particle size distribution-measuring apparatus LA-950 (manufactured by Horiba, Ltd.) as described below. First, a batch-type cell containing a measurement solvent was set in the laser diffraction/scattering particle size distribution-measuring apparatus LA-950, and the adjustment of an optical axis and the adjustment of a background were performed. Isopropyl alcohol (special grade, manufactured by Kishida Chemical Co., Ltd.) was used as the measurement solvent. The particles serving as a measuring object were added to the batch-type cell until the transmittance of light applied from a tungsten lamp became from 95% to 90%, and the measurement of their particle size distribution was performed. An average particle diameter on a volume basis was calculated from the obtained measurement result. Hereinafter, the measurement of the average particle diameter of the respective shaping material particles was similarly performed.

<Measurement of Viscoelasticities of Fiber-Containing Particles>

Viscoelasticity measurements are roughly classified into the following two kinds of methods: a dynamic viscoelasticity measurement and a static viscoelasticity measurement. The dynamic viscoelasticity measurement refers to a method involving: applying, to a sample serving as a measuring object, strain or stress that changes (vibrates) with time; and measuring the stress or the strain caused by the application to measure the mechanical properties of the sample. In addition, the static viscoelasticity measurement refers to a method involving measuring, under constant strain or constant stress that does not change with time, a change in stress or strain.

When the storage elastic modulus and loss elastic modulus of a sample are measured, the dynamic viscoelasticity measurement is typically performed. Specifically, strain that changes with time is applied to the sample, a response lag with respect to the applied strain is measured, and the storage elastic modulus and the loss elastic modulus are measured.

In this example, the dynamic viscoelasticity measurement was performed with a rheometer. The measurement of the temperature dependence of the dynamic viscoelasticity of each of the fiber-containing particles in its shearing direction was performed with MCR302 (manufactured by Anton Paar) serving as a rheometer. The measurement was performed with a parallel plate (PP10, manufactured by Anton Paar) by interposing, between a heating plate and the parallel plate, a molded body molded by using the fiber-containing particles. The molded body was obtained by molding an aggregate of the fiber-containing particles with a pressure molding machine. At this time, a columnar pressure-molded body having a diameter of 10 mm and a height of 1 mm was molded by applying a pressure of 2 MPa to the particles at normal temperature and maintaining the state for 1 minute. The measurement of the temperature dependence of the dynamic viscoelasticity was performed by a vibration measurement method in the following temperature range. The measurement was performed by an automatic measurement mode at an angular frequency of 1 Hz (6.28 radians/sec) and an initial value of a strain amount of 0.1%. In addition, the measurement was performed while the height of the parallel plate was changed at the appropriate times so that a load was not applied to the molded body by the parallel plate. The temperature range at the time of the measurement was a temperature range of from 100° C. or more to 220° C. or less, and the measurement was performed while the temperature of each of the particles was increased at a rate of 2° C./sec. In addition, viscoelasticity data was measured in increments of from 0.5° C. to 1.0° C.

Figure 4:
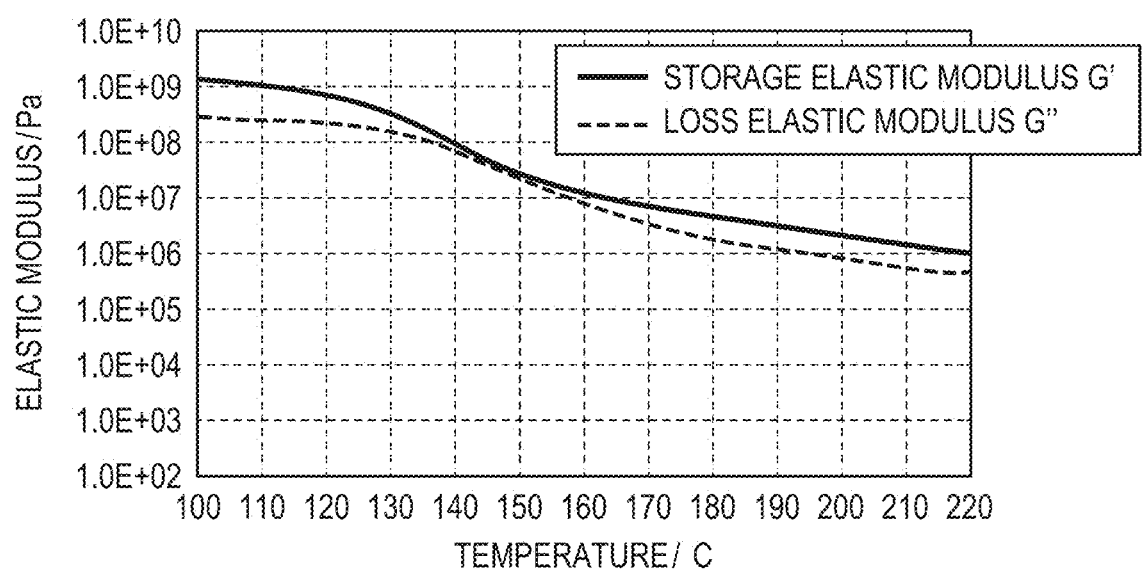
FIG. 4 is a graph for showing the storage elastic modulus and loss elastic modulus of each of support material particles used in Examples and Comparative Examples.

The results of the viscoelasticity measurement of the fiber-containing particles of Preparation Example 1 are shown in FIG. 4. The graph is a graph obtained by plotting each of a storage elastic modulus G' and a loss elastic modulus G" against a temperature, and a solid line represents the storage elastic modulus G' and a broken line represents the loss elastic modulus G". As can be seen from FIG. 4, in the temperature range of from 100° C. or more to 220° C. or less, the storage elastic modulus of each of the fiber-containing particles of Preparation Example 1 is always larger than the loss elastic modulus thereof, and hence the particles each always show rubber-like behavior. In addition, the softening temperature of each of the fiber-containing particles at which the storage elastic modulus became 10 MPa was about 163° C.

Example 1

About 0.05 g of the fiber-containing particles of Preparation Example 1 were loaded into a pellet die having a diameter of 8 mm. A load of 0.1 MPa was applied to the particles with a pressure pressing apparatus (manufactured by Masada Seisakusho Co., Ltd., MASADA JACK MH-10), and the temperature of each of the particles was kept at 120° C. with an electrothermal heater. Thus, a pellet having a diameter of 8 mm and a thickness of 1 mm was obtained.

The resultant pellet was immersed in a removing liquid obtained by adding 0.1% of lecithin (manufactured by Koyo Mercantile Co., Ltd., SOLEC K-EML) on a mass basis to distilled water. The removing liquid was warmed to about 60° C. on a hot plate, and was subjected to stirring with a stirrer and the application of ultrasonic vibration (24 kHz or 31 kHz, 100 W) with an ultrasonic generator (VS-D100 manufactured by As One Corporation).

A time period required for the pellet in a state of being immersed in the removing liquid to collapse to lose its shape when viewed with the eyes was measured, and removability was evaluated by the following criteria. The result is shown in Table 1. The removability in Table 1 was ranked from A to C, and was judged based on the following criteria.

| Rank A | Less than 6 hours |
|---|---|
| Rank B | 6 hours or more and less than 12 hours |
| Rank C | 12 hours or more |

Example 2

ABS (ABS130 manufactured by Techno Polymer Co., Ltd.) was mechanically pulverized to provide structural material particles having an average particle diameter of 50 μm.

Figure 5A:
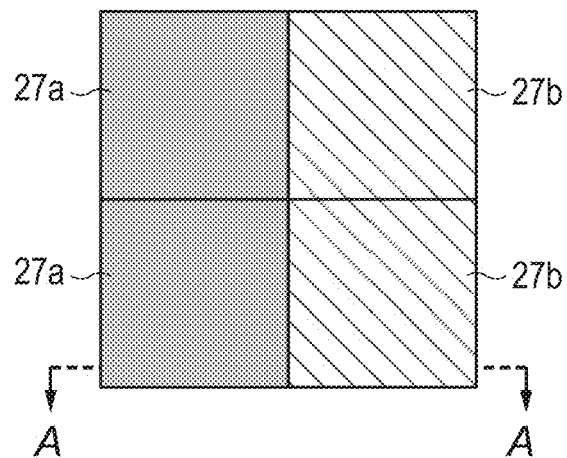
FIG. 5A, FIG. 5B, FIG. 5C, and FIG. 5D are each a view for schematically illustrating a three-dimensional object produced in each of Examples and Comparative Examples.
Figure 5B:
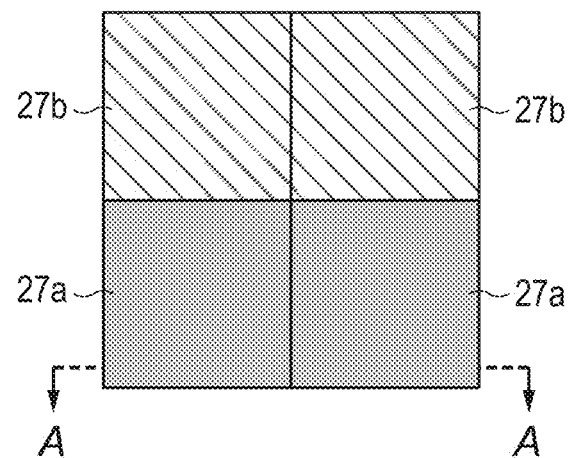
Figure 5C:
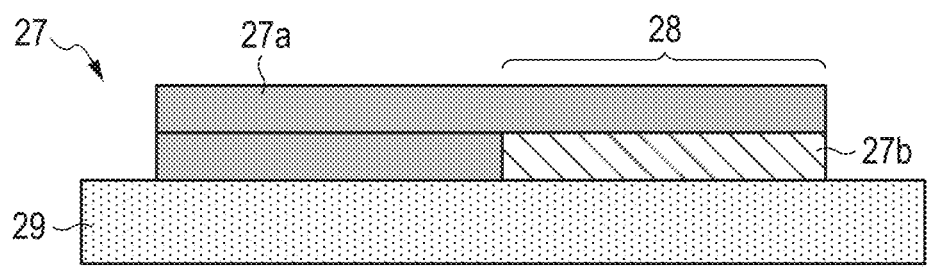

A three-dimensional object according to the present invention was produced by using the structural material particles and the fiber-containing particles of Preparation Example 1 serving as support material particles. First, a material layer was formed according to a pattern illustrated in FIG. 5A (each square was 20 mm on a side), and lamination was performed by: heating and melting such layers at about 180° C. to superimpose the layers on each other; and retaining the resultant for 10 seconds while pressurizing the resultant at a pressure of 10 N from above. The lamination was performed 100 times to provide a shaped object having a thickness of 1.5 mm on an ABS base material 29 (measuring 70 mm wide by 70 mm long by 10 mm thick). Further, lamination was performed according to a pattern illustrated in FIG. 5B, which was obtained by rotating the pattern of FIG. 5A by 90°, under the same conditions 100 times to provide a shaped object. FIG. 5C is a sectional view of the shaped object taken along the line A-A of FIGS. 5A and 5B.

Figure 5D:
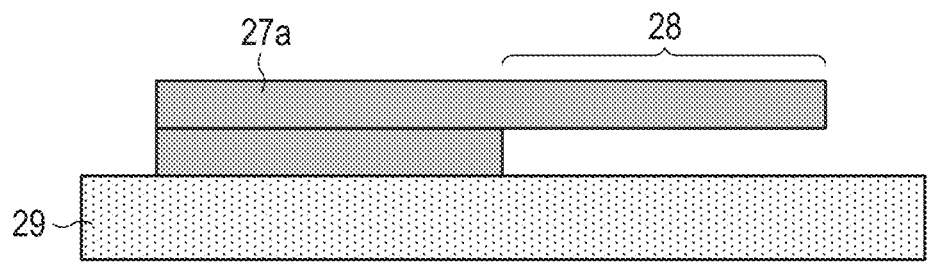

The shaped object illustrated in FIG. 5C was immersed in the removing liquid under the same conditions as those of Example 1 to remove the support portion 27b, whereby a three-dimensional object having an overhang portion 28 was obtained as illustrated in a sectional view of FIG. 5D. At this time, a time period required to achieve the following situation was measured, and removability was evaluated by the same criteria as those of Example 1: in a state in which the shaped object was immersed in the removing liquid, the support portion 27b of the overhang portion 28 disappeared, and hence a gap was able to be observed with the eyes. The result is shown in Table 1.

Comparative Example 1

Removability was evaluated in the same manner as in Example 1 except that no surfactant was used. The result is shown in Table 1.

Comparative Example 2

Removability was evaluated in the same manner as in Example 2 except that no surfactant was used. The result is shown in Table 1.

Comparative Examples 3, 4, and 5

Removability was evaluated in the same manner as in Example 1 except that a surfactant shown in Table 1 was used. The result is shown in Table 1.

TABLE 1

|  | Example | | Comparative Example | | | | |
|---|---|---|---|---|---|---|---|
|  | 1 | 2 | 1 | 2 | 3 | 4 | 5 |
| Shape | Pellet | Overhang | Pellet | Overhang | Pellet | Pellet | Pellet |
| Surfactant Kind | Lecithin | Lecithin | — | — | Pluronic P123 | CONTAMINON N | Dialkylammonium salt |
| Polarity | Bipolar | Bipolar | — | — | Nonpolar | Negative | Positive |
| Removability | A | A | B | C | B | B | B |

In Comparative Example 2 having the overhang portion, only water was used, and hence a gel-like barrier layer was formed on the support portion 27b to remarkably reduce the dissolution rate of the support portion. When the gel-like barrier layer was physically scraped off with a spatula or the like, the dissolution advanced. The presence or absence of the gel-like barrier layer was visually observed. Meanwhile, in Example 2 similarly having the overhang portion, the removing liquid having added thereto lecithin serving as a bipolar surfactant was used, and hence no gel-like barrier layer was formed and the support portion was able to be removed within a time period shorter than that of Comparative Example 2. The removing liquid used in Example 2 became clouded and opaque, and hence visual observation was performed after the three-dimensional object had been pulled up from the removing liquid.

A difference between Example 1 of a pellet shape and each of Comparative Examples 1, 3, 4, and 5 was not as large as that between Example 2 and Comparative Example 2. However, the removing performance of Example 1 using the removing liquid having added thereto lecithin serving as a bipolar surfactant was more excellent.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214170, filed Oct. 30, 2015 and Japanese Patent Application No. 2016-204268, filed Oct. 18, 2016 which are hereby incorporated by reference herein in their entirety.

What is claimed is:

1. A method of producing a three-dimensional object, comprising:
   a first step of placing and laminating a water-insoluble structural material and a support material containing a water-soluble material and a fiber material to form a material layer to form a shaped object; and
   a second step of bringing a portion of the shaped object including the support material into contact with a liquid containing water and a bipolar surfactant to remove the support material.

2. The method according to claim 1, wherein the first step comprises a heat fusing step of applying thermal energy to the structural material and the support material to fuse.

3. The method according to claim 2, wherein a temperature range in the heat fusing step comprises a temperature range including a softening temperature of each of the structural material.

4. The method according to claim 1, wherein the structural material and the support material each contain a thermoplastic material.

5. The method according to claim 1, wherein the fiber material has a solubility in water smaller than a solubility of the water-soluble material in water.

6. The method according to claim 1, wherein the fiber material comprises a fibrous organic matter having a hydroxyl group.

7. The method according to claim 1, wherein the fiber material comprises a material that is dispersible in water.

8. The method according to claim 1, wherein the fiber material has a solubility in water of less than 0.1 g/100 g.

9. The method according to claim 1, wherein the fiber material comprises nanofibers having an average fiber diameter of 1 nm to 500 nm.

10. The method according to claim 1, wherein the fiber material comprises one of cellulose nanofibers and chitin nanofibers.

11. The method according to claim 1, wherein the water-soluble material comprises a water-soluble organic material.

12. The method according to claim 11, wherein the water-soluble organic material contains one of a water-soluble saccharide, a polyalkylene oxide, and polyvinyl alcohol.

13. The method according to claim 1, wherein at least one of the structural material and the support material has a particle shape and has an average particle diameter of 1 µm to 100 µm.

14. The method according to claim 13, wherein the support material comprises support material particles, and
   wherein a material having a solubility in water smaller than a solubility of the water-soluble material in water is on a surface of each of the support material particles.

15. The method according to claim 13, wherein the structural material comprises structural material particles and the support material comprises support material particles, and
   wherein the first step comprises a step of developing electrostatic latent images formed on image-bearing members with the structural material particles and the support material particles to form particle images.

16. The method according to claim 1, wherein the surfactant comprises lecithin.

17. The method according to claim 1, wherein a softening temperature of the fiber material is higher than a softening temperature of the water-soluble material.

* * * * *